US012656528B2

(12) United States Patent
Harada et al.

(10) Patent No.: US 12,656,528 B2
(45) Date of Patent: Jun. 16, 2026

(54) WIRELESS COMMUNICATION SYSTEM, WIRELESS COMMUNICATION METHOD AND WIRELESS STATION

(71) Applicant: NTT, Inc., Tokyo (JP)

(72) Inventors: Koichi Harada, Musashino (JP); Junichi Abe, Musashino (JP); Fumihiro Yamashita, Musashino (JP)

(73) Assignee: NTT, Inc., Tokyo (JP)

( * ) Notice: Subject to any disclaimer, the term of this patent is extended or adjusted under 35 U.S.C. 154(b) by 32 days.

(21) Appl. No.: 18/878,098

(22) PCT Filed: Jun. 27, 2022

(86) PCT No.: PCT/JP2022/025619
§ 371 (c)(1),
(2) Date: Dec. 23, 2024

(87) PCT Pub. No.: WO2024/003996
PCT Pub. Date: Jan. 4, 2024

(65) Prior Publication Data
US 2025/0383474 A1      Dec. 18, 2025

(51) Int. Cl.
*G01W 1/00*       (2006.01)
*G01S 13/95*      (2006.01)
*G01W 1/10*       (2006.01)
(52) U.S. Cl.
CPC .............. *G01W 1/10* (2013.01); *G01S 13/95* (2013.01)
(58) Field of Classification Search
CPC .......... G01W 1/10; G01S 13/95; G01S 13/86; G01S 13/951; H04W 24/04; H04W 84/06
See application file for complete search history.

(56) References Cited

U.S. PATENT DOCUMENTS 6,201,494 B1 *   3/2001   Kronfeld ................. G01S 13/95
                                                                    702/3
9,223,020 B1 *  12/2015   Crosmer ............... G01S 13/953
                              (Continued)

OTHER PUBLICATIONS

Matsushita et al., "Infrastructure Satellite Communication System Applied to Disaster Countermeasure Service", NTT Access Network Service Systems Laboratories, NTT Technical Journal, Sep. 2005, pp. 14-17 (8 pages including English Translation).

(Continued)

*Primary Examiner* — Toan N Pham
(74) *Attorney, Agent, or Firm* — XSENSUS LLP

(57)        ABSTRACT

A wireless communication system according to one embodiment includes: a weather radar antenna that is provided in the wireless station and receives a weather radar signal transmitted from the wireless station toward the node station and reflected; rainfall amount prediction circuitry configured to predict a rainfall amount between the wireless station and the node station on the basis of the weather radar signal received; quality prediction circuitry configured to predict quality of wireless communication between the wireless station and the node station on the basis of the rainfall amount predicted; and switching control circuitry configured to perform control to switch a line connecting the node station and the wireless station to another line connecting the node station and another communication station before interruption of the line in a case where the quality of the wireless communication predicted is less than a predetermined threshold.

8 Claims, 6 Drawing Sheets

(56)  References Cited

U.S. PATENT DOCUMENTS 9,838,896 B1 * 12/2017 Barnickel ............. H04W 24/08
12,556,937 B2 * 2/2026 Ostrometzky ........ H04W 24/02

OTHER PUBLICATIONS

Toyoda et al., "Rainfall Prediction Method Using Meteorological Radar-Study of Estimate of Rainfall Distribution and Advection Model-", Research Report : UOOO50, Apr. 2001, 60 pages including English Translation.
Sugimoto et al., "Review of precipitation measurements and short term rainfall prediction methods by weather radar", Research report : U99041, Mar. 2000, 80 pages including English Translation.

* cited by examiner

WIRELESS COMMUNICATION SYSTEM, WIRELESS COMMUNICATION METHOD AND WIRELESS STATION

CROSS-REFERENCE TO RELATED APPLICATION

This application is a national stage application, pursuant to 35 U.S.C. § 371, of International Patent Application No. PCT/JP2022/025619, filed Jun. 27, 2022, the entire contents of which are incorporated herein by reference.

TECHNICAL FIELD

The present invention relates to a wireless communication system, a wireless communication method, and a wireless station.

BACKGROUND ART

In recent years, a mobile communication system has developed, and mobile services can be received on most of the ground. Furthermore, extreme coverage extension is one of requirements for a fifth generation (Beyond 5G) or sixth generation mobile communication system expected to be commercialized in the future.

Extreme coverage extension means extending a service area to a place where it is expensive to install an existing base station or a place where it is difficult to install a base station, such as a mountain, the sea, or the air. Furthermore, national resilience against natural disasters and the like is also required, and appearance of a communication system resilient against disasters on the ground is desired.

In order to implement such a wireless communication system, a non-terrestrial network (NTN) using a geostationary satellite, a medium earth orbit satellite (MEO), a low earth orbit satellite (LEO), a high altitude platform station (HAPS), an unmanned aerial vehicle (UAV), a drone, and the like has attracted attention.

In the NTN, the above-described satellites, HAPS, and the like connect communication links to each other to form a network, and are further connected to a mobile network on the ground via a ground base station. The satellites and the HAPS are equipped with mobile base station functions.

A communication line in the HAPS includes a feeder link (FL) between the HAPS and a ground gateway station (ground station) on the ground communication network side and a service link (SL) between a communication relay device and a terminal. For example, the HAPS is located at an altitude of approximately 20 km, and the radius of a ground area (cell) is approximately 50 km. In the service link of the HAPS, use of a frequency of 2 GHz is assumed, but, in the feeder link, use of millimeter waves in a higher frequency band (for example, 38 GHz band) has been examined.

Traffic packets transmitted by the terminal are transferred to the HAPS connected to the ground station by a routing function and are transmitted to the Internet network. Packets transmitted from the Internet network to another terminal are also subjected to similar processing by the routing function.

In the NTN, radio waves in a high frequency band are used, and deterioration in wireless communication quality caused by an influence of rainfall is assumed. For example, in a case where there is an influence of rainfall, a service may be disconnected due to rainfall in the feeder link (FL) of the NTN using the high frequency band.

In addition, radio waves having a relatively high frequency are used in fixed microwave wireless systems used in suburban areas, rural areas, and the like with low population density, and it is conceivable that the communication quality deteriorates due to rainfall on a propagation path.

Therefore, there is a need for a configuration for improving the operation rate of the wireless communication system in consideration of an influence of weather such as rainfall.

For example, in order to achieve high reliability of communication in the event of a disaster or the like, there is known a technique for performing monitoring control by installing working and spare devices in each of a base station, a control station, and a management station (for example, Non Patent Literature 1).

In addition, precipitation observation using a weather radar for considering an influence of rainfall and a rainfall prediction method using a weather radar are known (for example, Non Patent Literatures 2 and 3).

CITATION LIST

Non Patent Literature

Non Patent Literature 1: Akira Matsushita, and other 7 persons, "Saigai taisaku service ni tekiyou suru infura eisei tsushin system (in Japanese) (Infrastructure Satellite Communication System Applied to Disaster Countermeasure Service)", NTT Technical Journal, September 2005, pp. 14-17

Non Patent Literature 2: "Rainfall Prediction Method Using Meteorological Radar-Study of Estimate of Rainfall Distribution and Advection Model-", Research Report: U00050, CRIEPI report, Central Research Institute of Electric Power Industry, April 2001

Non Patent Literature 3: "Review of precipitation measurements and short term rainfall prediction methods by weather radar", Research Report: U99041, CRIEPI report, Central Research Institute of Electric Power Industry, March 2000

SUMMARY OF INVENTION

Technical Problem

The present invention has been made in view of the above-described problems, and an object of the present invention is to provide a wireless communication system, a wireless communication method, and a wireless station capable of preventing interruption of wireless communication caused by an influence of weather.

Solution to Problem

A wireless communication system according to one embodiment of the present invention is a wireless communication system including a wireless station whose propagation path to a node station that relays wireless communication can be influenced by weather, the wireless communication system including: a weather radar antenna that is provided in the wireless station and receives a weather radar signal transmitted from the wireless station toward the node station and reflected; a rainfall amount prediction unit that predicts a rainfall amount between the wireless station and the node station on the basis of the weather radar signal received by the weather radar antenna; a quality prediction unit that predicts quality of wireless communication between the wireless station and the node station on the basis of the rainfall amount predicted by the rainfall amount prediction unit; and a switching control unit that performs control to switch a line connecting the node station and the wireless station to another line connecting the node station and another communication station before interruption of the line in a case where the quality of the wireless communication predicted by the quality prediction unit is less than a predetermined threshold.

In addition, a wireless communication method according to one embodiment of the present invention is a wireless communication method performed by a wireless communication system including a wireless station whose propagation path to a node station that relays wireless communication can be influenced by weather, the wireless communication method including: a rainfall amount prediction step of predicting a rainfall amount between the wireless station and the node station on the basis of a weather radar signal received by a weather radar antenna that is provided in the wireless station and receives the weather radar signal transmitted from the wireless station toward the node station and reflected; a quality prediction step of predicting quality of wireless communication between the wireless station and the node station on the basis of the predicted rainfall amount; and a switching control step of performing control to switch a line connecting the node station and the wireless station to another line connecting the node station and another communication station before interruption of the line in a case where the predicted quality of the wireless communication is less than a predetermined threshold.

In addition, a wireless station according to one embodiment of the present invention is a wireless station whose propagation path to a node station that relays wireless communication can be influenced by weather, the wireless station including: a weather radar antenna that receives a weather radar signal transmitted toward the node station and reflected; a rainfall amount prediction unit that predicts a rainfall amount between the wireless station and the node station on the basis of the weather radar signal received by the weather radar antenna; a quality prediction unit that predicts quality of wireless communication between the wireless station and the node station on the basis of the rainfall amount predicted by the rainfall amount prediction unit; and a modem that superimposes quality information indicating that the quality of the wireless communication predicted by the quality prediction unit is less than a predetermined threshold on a control signal transmitted from the wireless station to the node station in a case where the quality of the wireless communication is less than the predetermined threshold.

Advantageous Effects of Invention

According to the present invention, it is possible to prevent interruption of wireless communication caused by an influence of weather.

DESCRIPTION OF EMBODIMENTS

Figure 6:
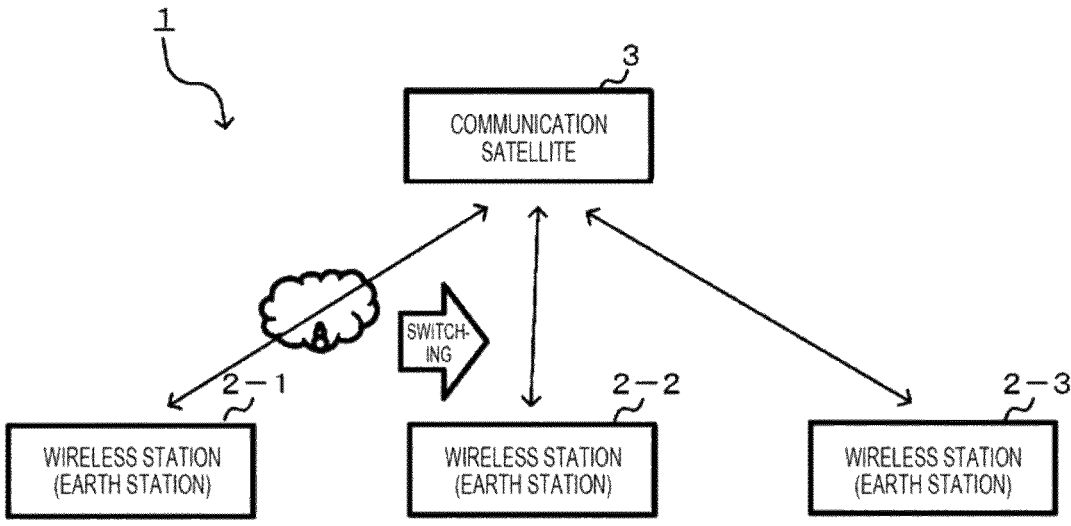
FIG. 6 is a diagram illustrating a configuration example of a wireless communication system.

First, the background of the present invention will be described. FIG. 6 is a diagram illustrating a configuration example of a wireless communication system 1. As illustrated in FIG. 6, the wireless communication system 1 is configured such that, for example, a plurality of wireless stations 2-1 to 2-3 can each perform wireless communication via a communication satellite 3.

Each of the wireless stations 2-1 to 2-3 is, for example, an earth station having a function of a base station, and is connected to a mobile network (not illustrated). The communication satellite 3 is a node station that relays wireless communication with each of the wireless stations 2-1 to 2-3.

For example, in the wireless communication system 1, it is assumed that rainfall occurs between the wireless station 2-1 and the communication satellite 3. The wireless station 2-1 observes the quality of wireless communication with the communication satellite 3 in real time, and in a case where the quality of the wireless communication deteriorates, for example, performs site diversity for switching such that the wireless station 2-2 performs wireless communication with the communication satellite 3.

The site diversity in the wireless communication system 1 switches a wireless station, which is triggered by deterioration of the actual communication quality after occurrence of rainfall, for example, when the communication quality falls below a predetermined threshold. Therefore, in the wireless communication system 1, communication may be disconnected before switching of the wireless station depending on the rainfall situation.

Therefore, a wireless communication system according to one embodiment is configured to improve an operation rate by performing rainfall prediction using, for example, weather information observed by a plurality of wireless stations each including a weather radar, predicting deterioration in communication quality, and switching a wireless station before wireless communication is interrupted.

Figure 1:
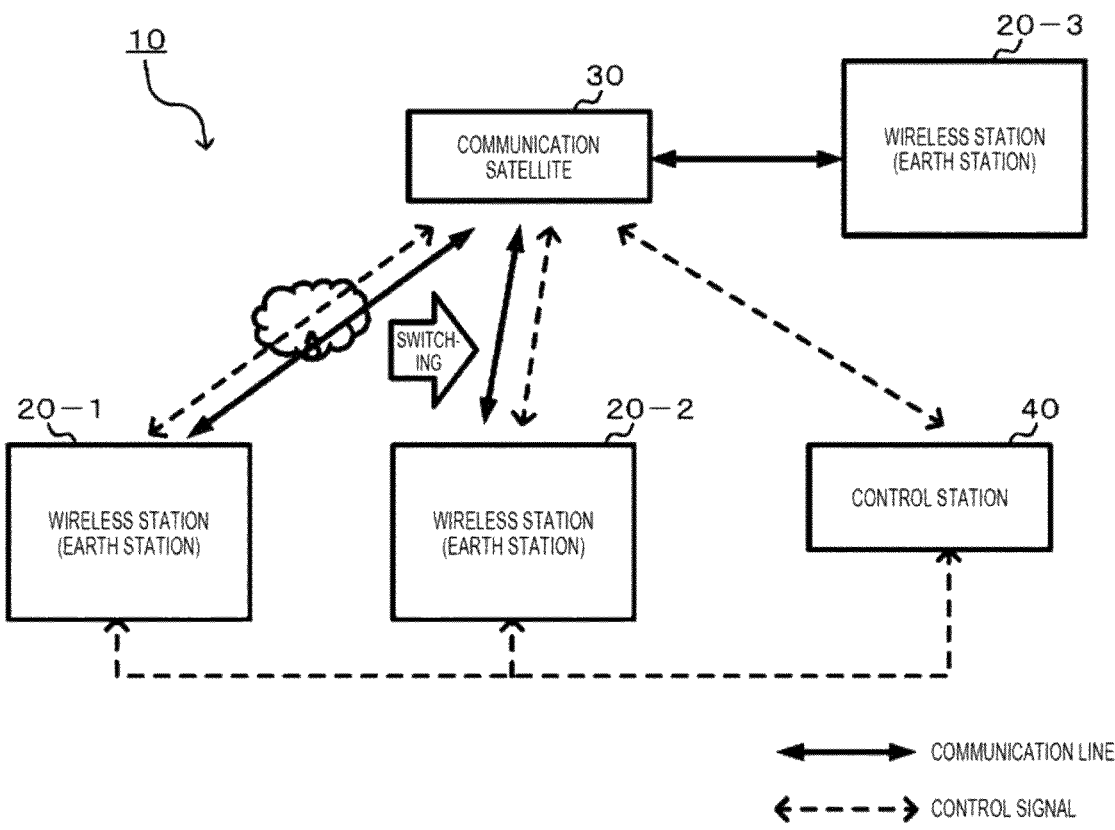
FIG. 1 is a diagram illustrating a configuration example of a wireless communication system according to one embodiment.

FIG. 1 is a diagram illustrating a configuration example of a wireless communication system 10 according to the one embodiment. As illustrated in FIG. 1, the wireless communication system 10 includes, for example, a plurality of wireless stations 20-1 to 20-3, a communication satellite 30, and a control station 40, and constitutes an NTN. Note that, in a case where one of a plurality of components such as the wireless stations 20-1 to 20-3 is not specified, the plurality of components is simply abbreviated as the wireless stations 20 or the like.

Each of the wireless stations 20 is, for example, an earth station having a function of a base station and a weather radar, and is connected to a mobile network (not illustrated). The communication satellite 30 is a node station that relays wireless communication with each of the wireless stations 20 using a communication line. The control station 40 controls each device (including communication stations such as the wireless stations 20) constituting the wireless communication system 10 using a control signal.

For example, when the wireless station 20-1 is performing wireless communication with the wireless station 20-3 via the communication satellite 30, the wireless communication system 10 switches the path of the wireless communication in a case where the quality of the wireless communication is predicted to fall below a predetermined threshold (required C/N or the like) by using rainfall prediction based on weather data acquired by the wireless station 20-1.

For example, in a case where it is predicted that the quality of wireless communication between the wireless station 20-1 and the communication satellite 30 deteriorates due to rainfall (rain attenuation of radio waves) and falls below the predetermined threshold, the wireless communication system 10 switches the wireless communication between the wireless station 20-1 and the communication satellite 30 to wireless communication between the wireless station 20-2 and the communication satellite 30 for which the communication quality is not predicted to deteriorate before the quality of the wireless communication between the wireless station 20-1 and the communication satellite 30 actually deteriorates and falls below the predetermined threshold.

Figure 2:
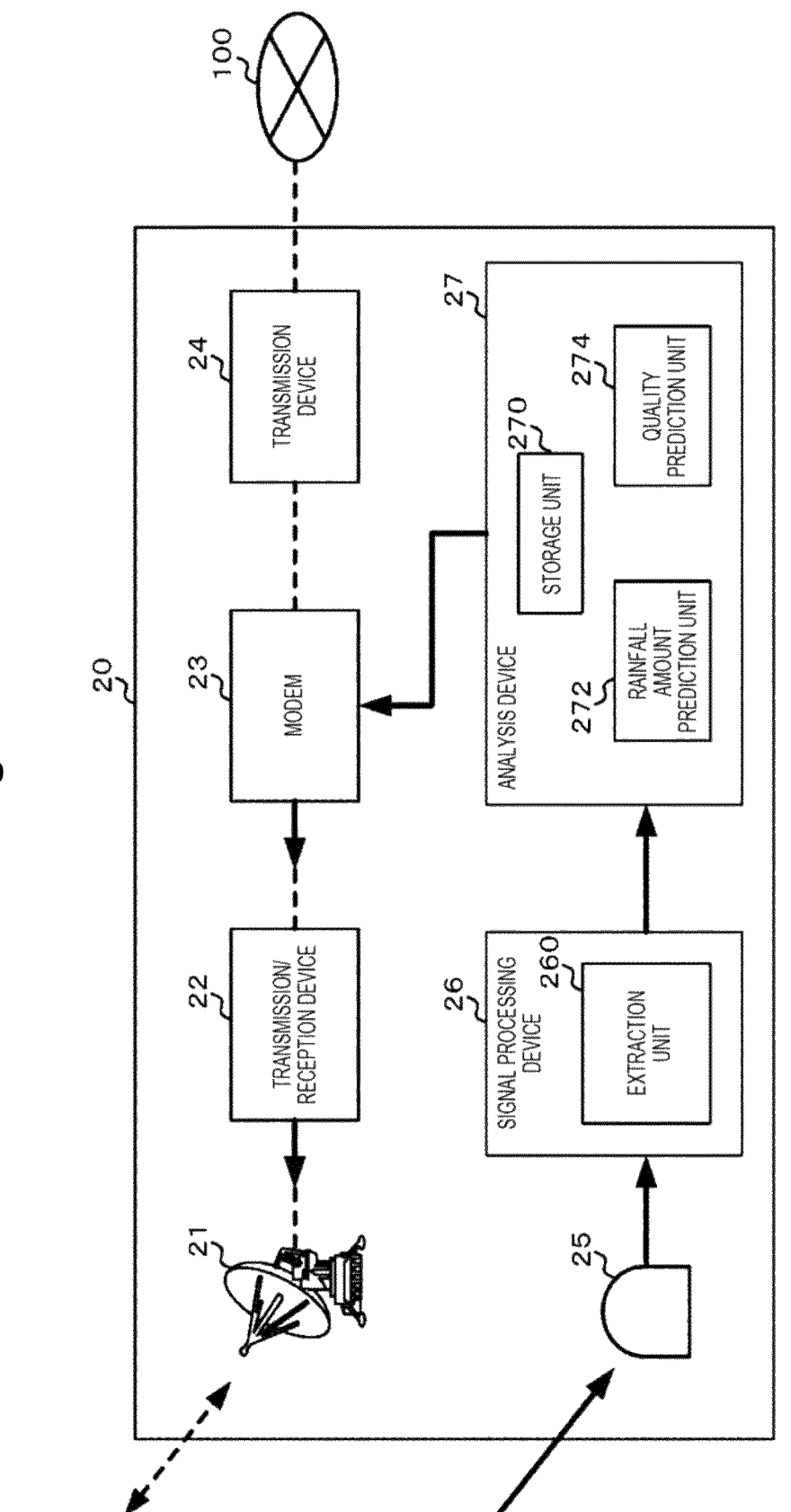
FIG. 2 is a block diagram illustrating a configuration example and functions of a wireless station.

Next, a specific configuration example and functions of one of the wireless stations 20 will be described. FIG. 2 is a block diagram illustrating the configuration example and the functions of the wireless station 20. As illustrated in FIG. 2, the wireless station 20 includes, for example, a communication system including a communication antenna 21, a transmission/reception device 22, a modem 23, and a transmission device 24, and a weather observation system including a weather radar antenna 25, a signal processing device 26, and an analysis device 27.

Furthermore, the wireless station 20 is connected to the control station 40 via, for example, a mobile network 100 or another network (not illustrated).

The communication antenna 21 is a communication antenna for performing wireless communication with the communication satellite 30. The transmission/reception device 22 is a device that transmits and receives signals to and from the communication satellite 30 via the communication antenna 21.

The modem 23 is a device that modulates and demodulates signals transmitted and received by the wireless station 20 and outputs the signals to the transmission/reception device 22 (and the transmission device 24). Furthermore, the modem 23 has a function of superimposing a signal output from the analysis device 27 (for example, quality information to be described later) on a transmission signal to the communication satellite 30 (or the control station 40).

For example, in a case where the quality of wireless communication predicted by a quality prediction unit 274 to be described later is less than a predetermined threshold, the modem 23 superimposes quality information indicating that the quality of the wireless communication is less than the predetermined threshold on a control signal transmitted from the wireless station 20 to the communication satellite 30.

The transmission device 24 is a device that is connected to the mobile network 100 and transmits and receives signals to and from the mobile network 100.

The weather radar antenna 25 transmits a weather radar signal in a communication partner direction (for example, a direction toward the communication satellite 30), receives the weather radar signal reflected and returned by the communication satellite 30, a rain cloud, and rainfall, and outputs the weather radar signal to the signal processing device 26.

That is, since the propagation path between the wireless station 20 and the communication satellite 30 may be influenced by weather, the weather radar antenna 25 is provided in the wireless station 20, and receives the weather radar signal transmitted from the wireless station 20 toward the communication satellite 30 and reflected.

The signal processing device 26 includes an extraction unit 260, performs signal processing on the weather radar signal output from the weather radar antenna 25, and outputs the result of the signal processing to the analysis device 27. For example, the extraction unit 260 extracts data necessary for rainfall amount prediction, such as a radar reflection factor Z (dBZ) and a rainfall intensity R (mm/h), from the weather radar signal received by the weather radar antenna 25, and outputs the extracted data to the analysis device 27.

The analysis device 27 includes, for example, a storage unit 270, a rainfall amount prediction unit 272, and the quality prediction unit 274, analyzes the data output from the signal processing device 26 using parameters such as the frequency, and outputs the analysis result (processing result) such as quality information to be described later to the modem 23.

For example, the storage unit 270 stores and accumulates, for example, data extracted by the extraction unit 260 and information indicating the quality of wireless communication (described later) predicted by the quality prediction unit 274.

The rainfall amount prediction unit 272 predicts the rainfall amount between the wireless station 20 and the communication satellite 30 on the basis of the weather radar signal received by the weather radar antenna 25, and outputs information indicating the predicted rainfall amount to the quality prediction unit 274. More specifically, the rainfall amount prediction unit 272 predicts the future rainfall amount between the wireless station 20 and the communication satellite 30 on the basis of the data stored in the storage unit 270 by, for example, a short-time rainfall prediction method using data for 20 minutes.

The quality prediction unit 274 predicts the quality (deterioration, rain attenuation amount, or the like) of wireless communication between the wireless station 20 and the communication satellite 30 on the basis of the rainfall amount predicted by the rainfall amount prediction unit 272 and the parameters such as the frequency, and outputs information indicating the predicted quality of the wireless communication (quality information) to, for example, the storage unit 270 (and the modem 23).

Note that the quality information may include C/N or information indicating whether or not the quality of the wireless communication is less than the predetermined threshold.

The analysis device 27 then outputs the quality information accumulated in the storage unit 270 to the modem 23, for example, in response to access from the modem 23.

Figure 3:
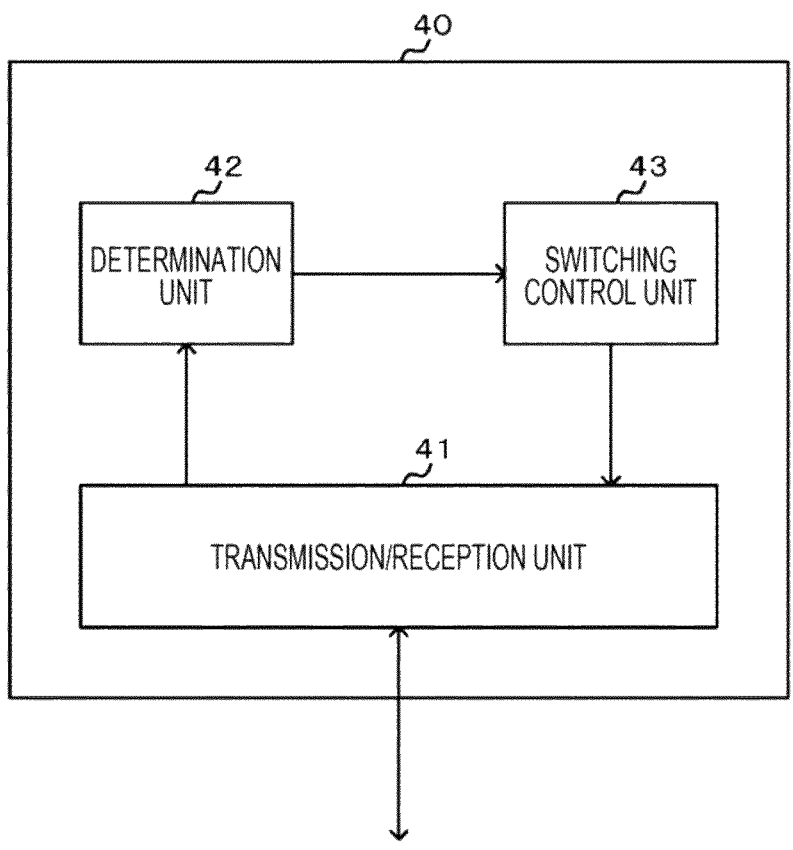
FIG. 3 is a block diagram illustrating functions of a control station.

Next, specific functions of the control station 40 will be described. FIG. 3 is a block diagram illustrating the functions of the control station 40. As illustrated in FIG. 3, the control station 40 includes, for example, a transmission/reception unit 41, a determination unit 42, and a switching control unit 43.

The transmission/reception unit 41 transmits and receives a control signal or the like to and from each of the wireless stations 20 and the communication satellite 30 by wireless communication or the like.

The determination unit 42 determines a switching destination of one of the wireless stations 20 on the basis of a control signal received by the transmission/reception unit 41

(for example, a control signal on which quality information transmitted from the wireless station 20 is superimposed). For example, in a case where there is a wireless station 20 in which the quality of wireless communication with the communication satellite 30 is less than a predetermined threshold, the determination unit 42 determines a wireless station 20 in which the quality of wireless communication with the communication satellite 30 is equal to or greater than the predetermined threshold as a line switching destination, and outputs the determined result to the switching control unit 43.

The switching control unit 43 performs control to switch the line connecting the communication satellite 30 and one of the wireless stations 20 to another line connecting the communication satellite 30 and another communication station (for example, another wireless station 20) via the transmission/reception unit 41 before interruption of the line in a case where the quality of wireless communication predicted by the quality prediction unit 274 of the one of the wireless stations 20 is less than the predetermined threshold.

For example, when the transmission/reception unit 41 receives quality information superimposed by the modem 23 of one of the wireless stations 20, the control station 40 performs control such that the switching control unit 43 performs control to switch the line. Specifically, the control station 40 transmits a control signal to both the wireless station 20 in which the quality of the wireless communication is less than the threshold and the wireless station 20 in which the quality of the wireless communication is equal to or greater than the threshold.

Before the line between the communication satellite 30 and the wireless station 20 in which the quality of the wireless communication is less than the threshold is interrupted, the control station 40 performs control to switch the line to the line between the communication satellite 30 and the wireless station 20 in which the quality of the wireless communication is equal to or greater than the threshold.

Figure 4:
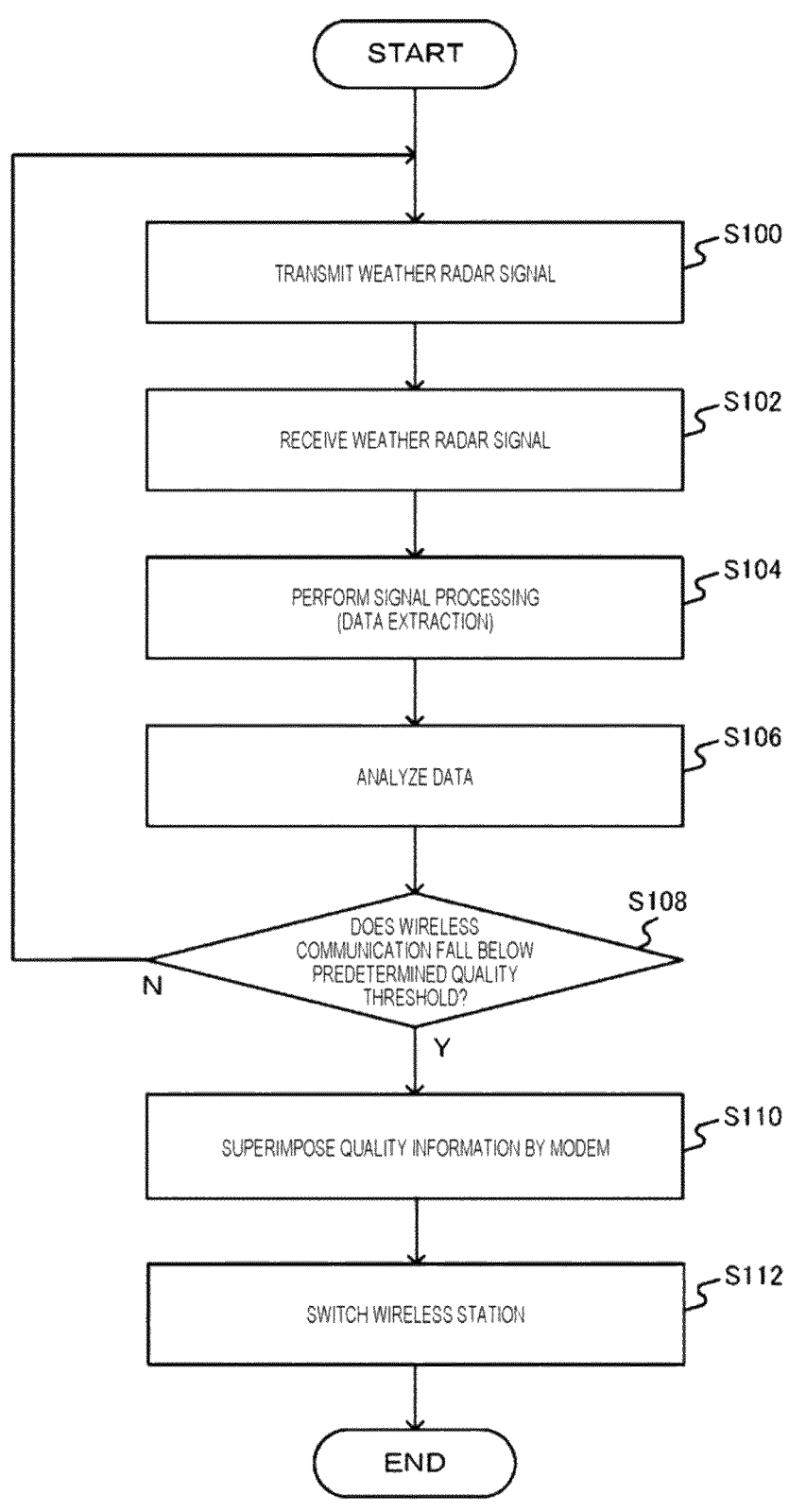
FIG. 4 is a flowchart illustrating an operation example of the wireless communication system according to the one embodiment.

Next, an operation example of the wireless communication system 10 will be described. FIG. 4 is a flowchart illustrating the operation example of the wireless communication system 10 according to the one embodiment. As illustrated in FIG. 4, in the wireless communication system 10, one of the wireless stations 20 transmits a weather radar signal by the weather radar antenna 25 (S100), and the weather radar antenna 25 receives the weather radar signal reflected and returned by a rain cloud and rainfall (S102).

The signal processing device 26 performs signal processing on the weather radar signal received by the weather radar antenna 25, and outputs, for example, data necessary for rainfall amount prediction extracted by the extraction unit 260 to the analysis device 27 (S104).

The analysis device 27 analyzes the data output from the signal processing device 26 (S106). Specifically, the quality prediction unit 274 predicts the quality (deterioration or the like) of wireless communication between the wireless station 20 and the communication satellite 30 on the basis of the rainfall amount predicted by the rainfall amount prediction unit 272. For example, information indicating the quality of the wireless communication (quality information) predicted by the quality prediction unit 274 includes information indicating whether or not the quality of the wireless communication is less than a predetermined threshold.

The analysis device 27 then determines whether or not the wireless communication between the wireless station 20 and the communication satellite 30 falls below the predetermined quality threshold on the basis of the quality information predicted by the quality prediction unit 274 (S108). In a case where the analysis device 27 determines that the wireless communication between the wireless station 20 and the communication satellite 30 falls below the predetermined quality threshold (S108: Yes), the processing proceeds to S110, and in a case where it is determined that the wireless communication does not fall below the predetermined quality threshold (S108: No), the processing returns to S100.

In step 110 (S110), the wireless station 20 superimposes quality information indicating that the quality of the wireless communication is less than the predetermined threshold on a transmission signal by the modem 23, and transmits the transmission signal on which the quality information is superimposed to the control station 40 via the communication satellite 30 (or directly).

That is, the wireless station 20 performs rainfall prediction based on the weather radar signal received by the weather radar antenna 25, and superimposes the quality information on the control signal and transmits the control signal to the control station 40 in the case of predicting that the quality of the wireless communication falls below the predetermined threshold.

In step 112 (S112), the control station 40 switches the wireless station 20. Specifically, before the line between the communication satellite 30 and the wireless station 20 in which the quality of the wireless communication is less than the threshold is interrupted, the control station 40 performs control to switch the line to the line between the communication satellite 30 and a wireless station 20 in which the quality of wireless communication is equal to or greater than the threshold.

As described above, the wireless communication system 10 switches the line connecting the communication satellite 30 and one of the wireless stations 20 to another line connecting the communication satellite 30 and another communication station (for example, another wireless station 20) before interruption of the line in a case where the quality of wireless communication predicted by the quality prediction unit 274 is less than a predetermined threshold. Thus, it is possible to prevent interruption of the wireless communication caused by an influence of weather.

Note that, in the wireless communication system 10 according to the one embodiment described above, the case where the communication satellite 30 serving as a node station is provided has been described as an example. However, the wireless communication system 10 may be a fixed microwave wireless system or the like including a node station other than the communication satellite 30, for example, a node station that is arranged on the ground and whose propagation path can be influenced by weather.

Furthermore, the wireless communication system 10 may include one or more wireless stations 20 and one or more other wireless stations 20 or a communication station that performs wired communication. In addition, in the wireless communication system 10, one or more wireless stations 20 may have all the functions of the control station 40.

Note that some or all of the functions of the wireless stations 20 and the control station 40 may be configured by hardware such as a programmable logic device (PLD) or a field programmable gate array (FPGA), or may be configured as a program executed by a processor such as a CPU.

For example, the wireless stations 20 and the control station 40 can each be implemented by use of a computer and a program, and the program can be recorded in a storage medium or provided through a network.

Figure 5:
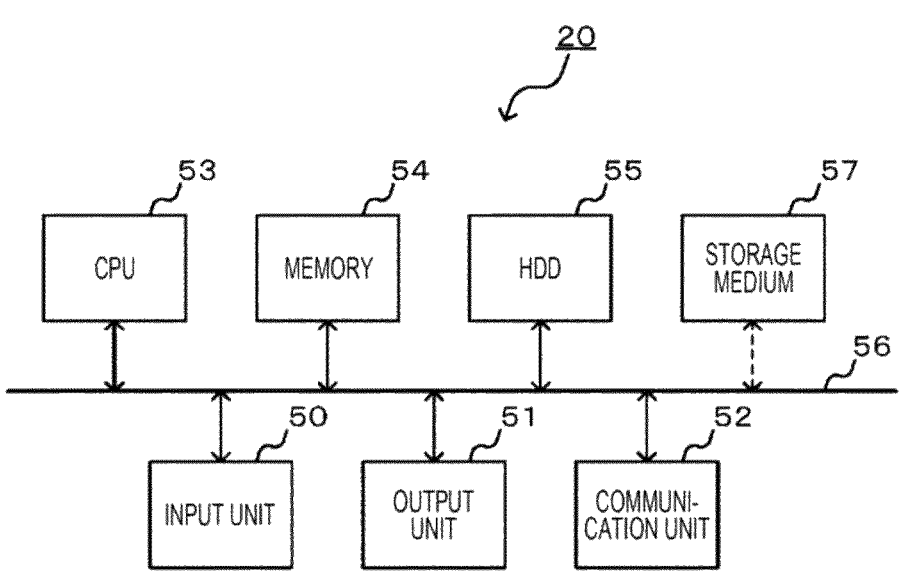
FIG. 5 is a diagram illustrating a hardware configuration example of the wireless station according to the one embodiment.

FIG. 5 is a diagram illustrating a hardware configuration example of one of the wireless stations 20 according to the one embodiment. As illustrated in FIG. 5, the wireless station 20 has a function of a computer in which an input unit 50, an output unit 51, a communication unit 52, a CPU 53, a memory 54, and an HDD 55 are connected via a bus 56. In addition, the wireless station 20 can input and output data to and from a computer-readable storage medium 57.

The input unit 50 is, for example, a keyboard and a mouse or the like. The output unit 51 is, for example, a display device such as a display. Furthermore, the input unit 50 and the output unit 51 may be configured as a touch panel or the like.

The communication unit 52 is a communication interface that performs wireless communication.

The CPU 53 controls each unit included in the wireless station 20, and performs predetermined processing and the like. The memory 54 and the HDD 55 store data and the like.

The storage medium 57 can store a program or the like for executing the functions of the wireless station 20. Note that the architecture that configures the wireless station 20 is not limited to the example illustrated in FIG. 5. In addition, the control station 40 may include hardware similar to that of the wireless station 20.

REFERENCE SIGNS LIST 1, 10 Wireless communication system
2-1 to 2-3, 20-1 to 20-3 Wireless station
21 Communication antenna
22 Transmission/reception device
23 Modem
24 Transmission device
25 Weather radar antenna
26 Signal processing device
27 Analysis device
3, 30 Communication satellite
40 Control station
41 Transmission/reception unit
42 Determination unit
43 Switching control unit
50 Input unit
51 Output unit
52 Communication unit
53 CPU
54 Memory
55 HDD
56 Bus
57 Storage medium
100 Mobile network
260 Extraction unit
270 Storage unit
272 Rainfall amount prediction unit
274 Quality prediction unit

The invention claimed is:

1. A wireless communication system including a wireless station whose propagation path to a node station that relays wireless communication influenced by weather, the wireless communication system comprising:

a weather radar antenna that is provided in the wireless station and receives a weather radar signal transmitted from the wireless station toward the node station and reflected;

rainfall amount prediction circuitry configured to predict a rainfall amount between the wireless station and the node station on a basis of the weather radar signal received by the weather radar antenna;

quality prediction circuitry configured to predict quality of wireless communication between the wireless station and the node station on a basis of the rainfall amount predicted by the rainfall amount prediction circuitry; and switching control circuitry configured to performs control to switch a line connecting the node station and the wireless station to another line connecting the node station and another communication station before interruption of the line in a case where the quality of the wireless communication predicted by the quality prediction circuitry is less than a predetermined threshold.

2. The wireless communication system according to claim 1, further comprising extraction circuitry configured to extract data necessary for rainfall amount prediction from the weather radar signal received by the weather radar antenna; and storage circuitry configured to store the data extracted by the extraction circuitry, wherein the rainfall amount prediction circuitry predicts the rainfall amount between the wireless station and the node station on a basis of the data stored in the storage circuitry.

3. The wireless communication system according to claim 1, further comprising a control station that controls the wireless station and the communication station, wherein the wireless station includes a modem that superimposes quality information indicating that the quality of the wireless communication predicted by the quality prediction circuitry is less than the predetermined threshold on a control signal transmitted from the wireless station to the node station in a case where the quality of the wireless communication is less than the predetermined threshold, and the control station performs control such that the switching control circuitry performs control to switch the line when the quality information superimposed by the modem is received.

4. A wireless communication method performed by a wireless communication system including a wireless station whose propagation path to a node station that relays wireless communication influenced by weather, the wireless communication method comprising:

predicting a rainfall amount between the wireless station and the node station on a basis of a weather radar signal received by a weather radar antenna that is provided in the wireless station and receives the weather radar signal transmitted from the wireless station toward the node station and reflected;

predicting quality of wireless communication between the wireless station and the node station on a basis of the predicted rainfall amount; and performing control to switch a line connecting the node station and the wireless station to another line connecting the node station and another communication station before interruption of the line in a case where the predicted quality of the wireless communication is less than a predetermined threshold.

5. The wireless communication method according to claim 4, further comprising extracting data necessary for rainfall amount prediction from the weather radar signal received by the weather radar antenna; and storing the extracted data in a storage circuitry, wherein in predicting the rainfall amount, the rainfall amount between the wireless station and the node station is predicted on a basis of the data stored in the storage circuitry.

6. A wireless station whose propagation path to a node station that relays wireless communication influenced by weather, the wireless station comprising:

a weather radar antenna that receives a weather radar signal transmitted toward the node station and reflected;

rainfall amount prediction circuitry configured to predict a rainfall amount between the wireless station and the node station on a basis of the weather radar signal received by the weather radar antenna;

quality prediction circuitry configured to predict quality of wireless communication between the wireless station and the node station on a basis of the rainfall amount predicted by the rainfall amount prediction circuitry; and a modem that superimposes quality information indicating that the quality of the wireless communication predicted by the quality prediction circuitry is less than a predetermined threshold on a control signal transmitted from the wireless station to the node station in a case where the quality of the wireless communication is less than the predetermined threshold.

7. The wireless station according to claim 6, further comprising extraction circuitry configured to extract data necessary for rainfall amount prediction from the weather radar signal received by the weather radar antenna; and storage circuitry configured to store the data extracted by the extraction circuitry, wherein the rainfall amount prediction circuitry predicts the rainfall amount between the wireless station and the node station on a basis of the data stored in the storage circuitry.

8. The wireless station according to claim 6, further comprising switching control circuitry configured to perform control to switch a line connecting the node station and the wireless station to another line connecting the node station and another communication station before interruption of the line in a case where the quality of the wireless communication predicted by the quality prediction circuitry is less than the predetermined threshold.

* * * * *